United States Patent
Viola et al.

(10) Patent No.: US 10,481,416 B1
(45) Date of Patent: Nov. 19, 2019

(54) SYSTEM AND POST-OPERATIVE CARE DEVICE FOR LIFTING AN EYEWEAR FRAME BRIDGE

(71) Applicants: Giuseppe Viola, Dana Point, CA (US); Adriana Ortega, Dana Point, CA (US)

(72) Inventors: Giuseppe Viola, Dana Point, CA (US); Adriana Ortega, Dana Point, CA (US)

( * ) Notice: Subject to any disclaimer, the term of this patent is extended or adjusted under 35 U.S.C. 154(b) by 0 days.

(21) Appl. No.: 16/363,014

(22) Filed: Mar. 25, 2019

(51) Int. Cl.
  *G02C 3/00* (2006.01)
  *G02C 11/00* (2006.01)

(52) U.S. Cl.
  CPC .................................... *G02C 11/00* (2013.01)

(58) Field of Classification Search
  CPC ...... G02C 3/003; G02C 5/122; G02C 13/003; G02C 3/00; G02C 5/124; G02C 5/126; G02C 5/20; G02C 5/2209; G02C 9/04
  USPC ........................................ 351/123, 158, 155
  See application file for complete search history.

(56) References Cited

U.S. PATENT DOCUMENTS 3,955,885 A * 5/1976 Aronsohn ................ G02C 3/00
  351/155
5,506,638 A * 4/1996 Donner .................. G02C 3/003
  351/123

\* cited by examiner

*Primary Examiner* — Hung X Dang
(74) *Attorney, Agent, or Firm* — Jafari Law Group, Inc.

(57) ABSTRACT

Generally, the invention involves a post-operative care system configured to lift an eyewear frame away from the face, and more specifically, away from the nose. The system may include glasses having one or more extending legs that protrude away from each lens rim of the eyewear frame and have a length substantially perpendicular to each lens of the eyewear frame. In some embodiments, the leg is integral with the eyewear frame. In exemplary embodiments, each leg is removable from the eyewear frame and includes a first terminal end that receives a portion of the rim of each lens of the frame, and a second terminal end having a flat support surface configured to rest substantially flat against a portion of the wearer's face, such as against a portion of the wearer's cheek bone. In some exemplary embodiments, a length of the leg of the device is adjustable.

18 Claims, 7 Drawing Sheets

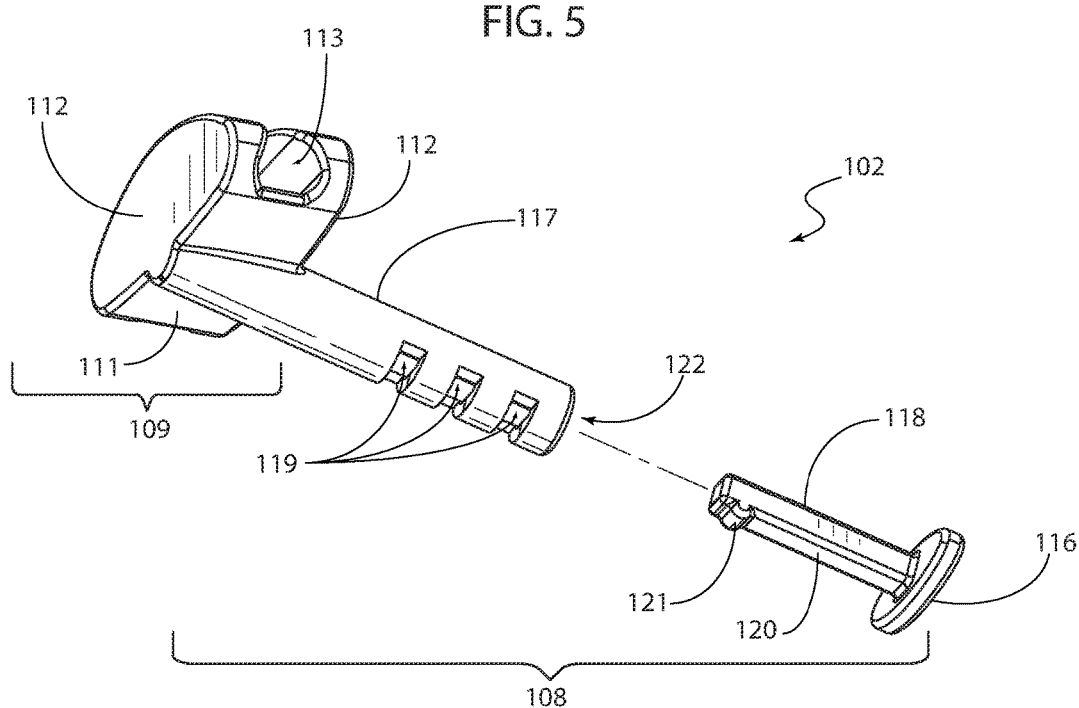
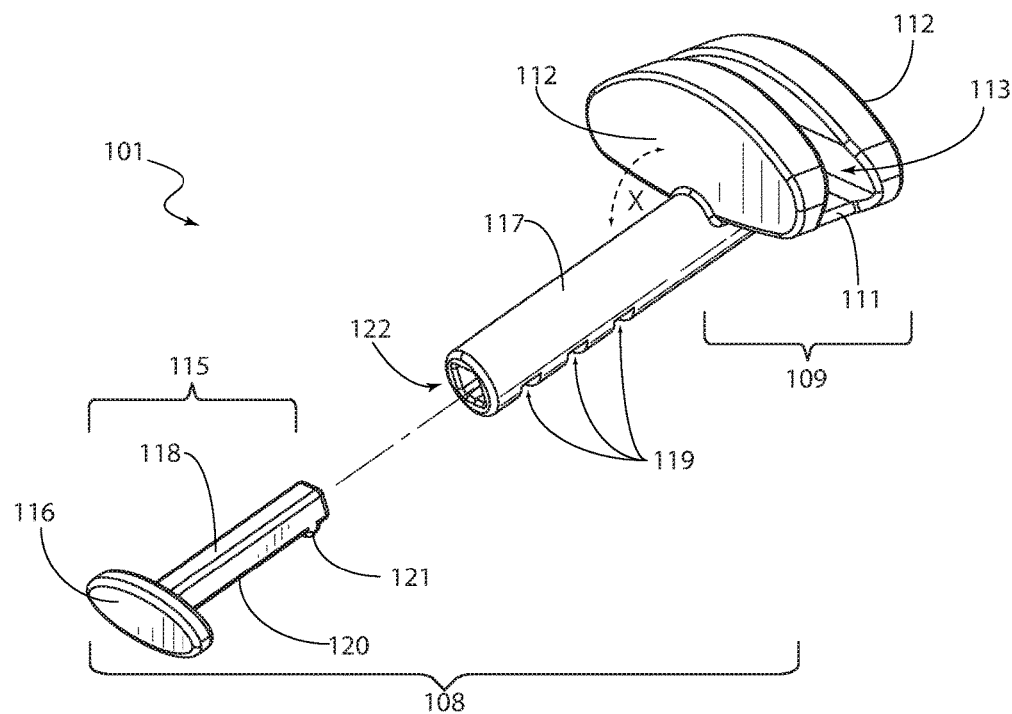

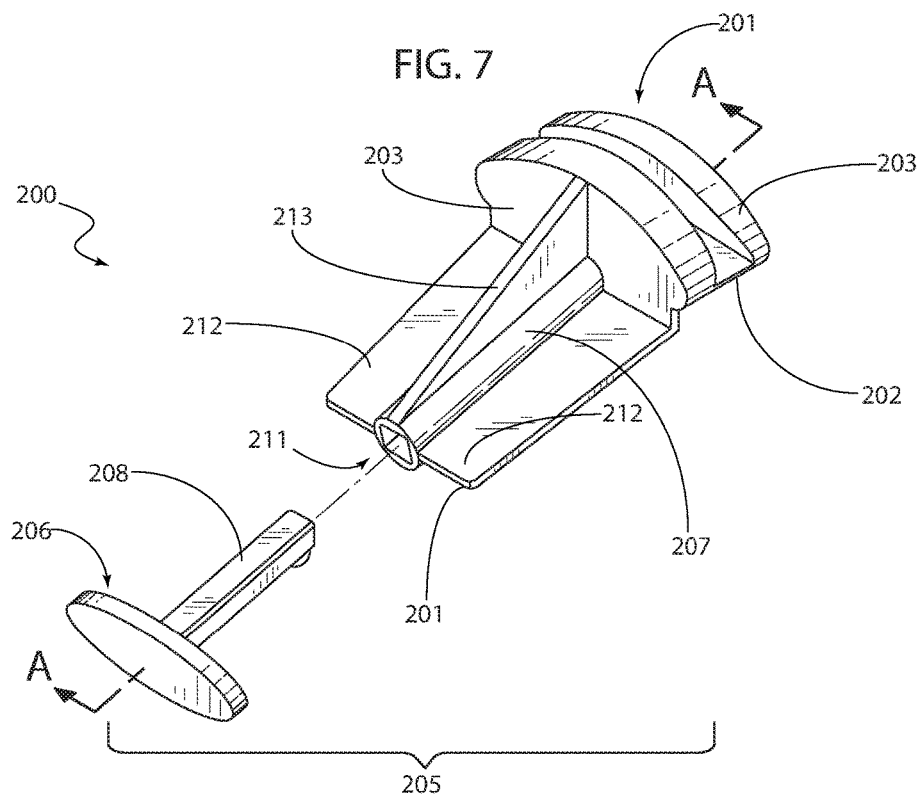
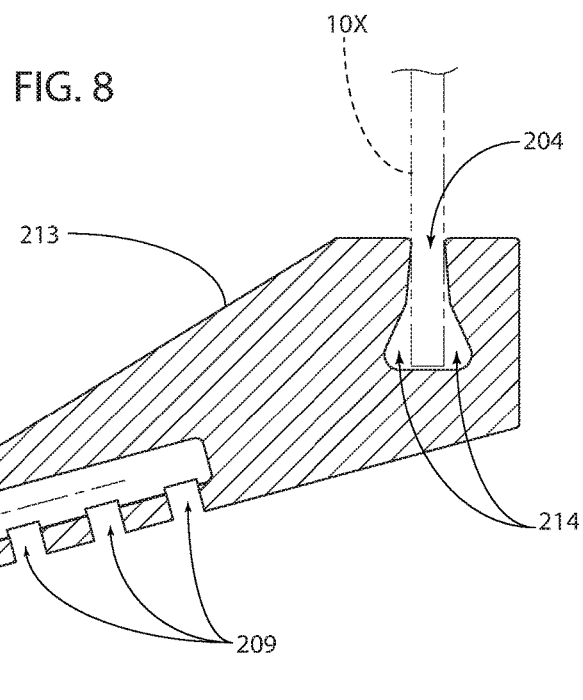

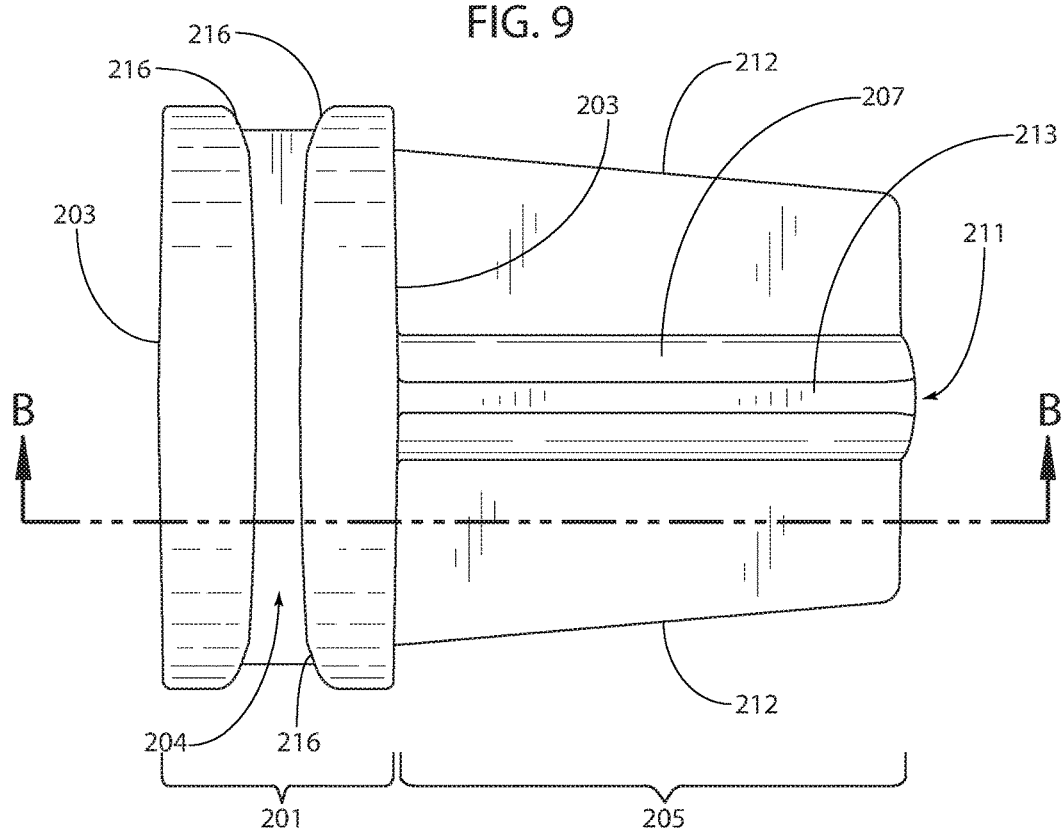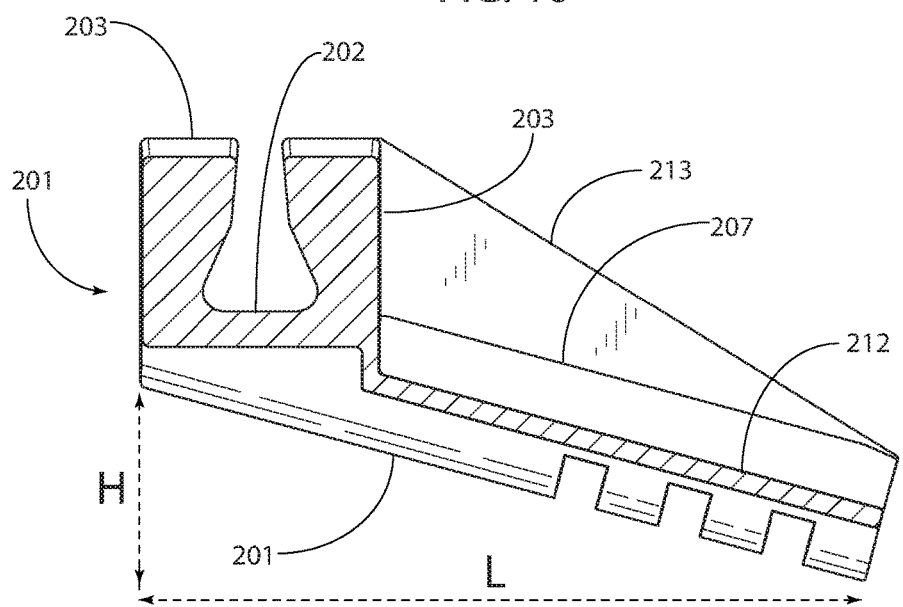

SYSTEM AND POST-OPERATIVE CARE DEVICE FOR LIFTING AN EYEWEAR FRAME BRIDGE

TECHNICAL FIELD OF THE INVENTION

The present invention relates generally to post-medical or post-operative care devices. More specifically, the present invention relates to a system and post-operative care device for lifting an eyewear frame bridge away from the face, which facilitates a safe recovery after a procedure such as a plastic surgery procedure, or rhinoplasty, for correcting and reconstructing the nose.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

The prior art discloses a variety of post-medical treatment apparatus or post-operative care devices, which help patients recover after undergoing treatment such as surgical procedures and the like. For example, a patient that is treated for a broken arm may use an immobilizer to help the bone heal. Similarly, a patient treated for a condition on their midfoot or heel may undergo surgery and require crutches to facilitate a full recovery on the affected foot. Yet, the prior art is devoid of post-operative devices that adequately address the needs of certain categories of patients that have undergone rhinoplasty; more specifically, the prior art seems to inadequately address the needs of a prescription eyeglasses wearer that requires surgical treatment in the nose area and must therefore use their prescription eyewear after the surgical procedure.

That is, when an individual who wears eyeglasses, otherwise known as spectacles or more generally eyewear, undergoes surgery on the nose to change its shape or improve its function, the patient is typically forced to wear certain bandages that will protect the nose while it heels subsequent to the surgery. However, during the post-operative period when a bandage or even a cast may be commonly employed over the nose area, it may be desirable to either avoid wearing glasses, or wear certain types of glasses that do not have a bridge. Of course, in the latter case, the wearer is required to purchase different glasses for the weeks or months of recovery. In the former case, avoiding wearing glasses may be prohibitive to a patient that wears corrective or prescription eyewear.

Moreover, once the bandage or cast is removed, patients are often advised not to use eyewear directly on their nose for weeks, even months, after surgery because avoiding eyewear on the nose area typically prevents potentially shifting of any nasal bones that may have been fractured during the surgical procedure.

Accordingly, patients that must wear their glasses after undergoing such procedures often find themselves having to wear uncomfortable nose-guards that often include a headband and a nose piece that holds the glasses in front of the wearer. These devices are often uncomfortable to wear and thus undesirable, primarily due to the pressure from the headband that compounds on the discomfort of their healing nose. Thus, while some solutions require purchasing a new set of eyewear, other solutions require the wearer to be generally more uncomfortable.

Therefore, there exists a previously unappreciated need, and an inadequately addressed problem, requiring a system and device for lifting an eyewear frame bridge away from the face to allow a patient requiring or desiring to use glasses to fully recover post-operation. It is to these ends that the present invention has been developed.

SUMMARY OF THE INVENTION

To minimize the limitations in the prior art, and to minimize other limitations that will be apparent upon reading and understanding the present specification, the present invention describes a post-operative care system and device for lifting an eyewear frame bridge away from a wearer' face, which facilitates a safe recovery after undergoing operations such as an open or closed rhinoplasty surgery.

Generally, the invention involves a post-operative care system of one or more devices, each of which couples to a portion of an eyewear frame and is configured to rest against a portion of the wearer's face, in a manner such that the eyewear frame bridge is lifted away from the face, and more specifically, away from the nose. Each device may include a coupler or a clasp having a channel that receives a portion of the rim of the frame holding each lens of the eyewear. Extending from the clasp, a leg may be positioned such that the leg of the device runs a length perpendicular to a width of the eyewear frame. At a terminal end of the leg of the device, a flat support surface may be configured to rest substantially flat against a portion of the wearer's face, such as against a portion of the wearer's cheek bone. In some exemplary embodiments, a length of the leg of the device is extendable and thus adjustable. In some exemplary embodiments, special eyewear may incorporate the extending devices that protrude from a portion of the frame of the eyewear.

A system for lifting an eyewear frame bridge away from a wearer's face, in accordance with some exemplary embodiments of the present invention, may include: eyewear, including a frame with a pair of rims that secure lenses therein, a pair of temples hingely coupled to the frame, and a bridge connecting each of the pair of rims; and at least one post-operative care device including a telescoping leg coupled to a bottom portion of one of the pair of rims of the frame, the telescoping leg including: a tubular housing with a plurality of openings along a length of the tubular housing; and an extending member slidably housed inside the tubular housing including a terminal end opposite the clasp configured to rest against the wearer's face, wherein a surface of the extending member includes at least one stop that registers with each of the plurality of openings along the length of the tubular housing to lock the extending member of the telescoping leg at a plurality of lengths.

A post-operative care device for lifting an eyewear frame bridge away from a wearer's face, in accordance with some exemplary embodiments of the present invention, may include: a clasp configured to register with eyewear, the eyewear including a frame, a pair of rims that secure lenses therein, a pair of temples hingely coupled to the frame, and a bridge connecting the pair of rims; and a telescoping leg extending from the base of the clasp, the telescoping leg including: a tubular housing with a plurality of openings along a length of the tubular housing; and an extending member slidably housed inside the tubular housing including a terminal end opposite the clasp configured to rest against the wearer's face, wherein a surface of the extending member includes at least one stop that registers with each of the plurality of openings along the length of the tubular housing to lock the extending member of the telescoping leg at a plurality of lengths.

A post-operative care device for lifting an eyewear frame bridge away from a wearer's face, in accordance with some exemplary embodiments of the present invention, may include: a clasp configured to register with eyewear, the eyewear including a frame, a pair of rims that secure lenses therein, a pair of temples hingely coupled to the frame, and a bridge connecting the pair of rims, wherein the clasp includes a base with parallel walls that form a channel for receiving the bottom portion of one of the pair of rims of the frame; an adjustable leg extending at an angle from the base of the clasp; and a flat surface coupled to a terminal end of the adjustable leg opposite the base of the clasp, the flat surface adapted to rest against the wearer's face.

A post-operative care device for lifting an eyewear frame bridge away from a wearer's face, in accordance with some exemplary embodiments of the present invention, may include: a frame with a pair of rims that secure lenses therein; a pair of temples hingely coupled to the frame; a bridge connecting each of the pair of rims; a pair of legs extending from a bottom portion of each of the pair of rims of the frame, wherein the pair of legs each extend at an angle towards a posterior of the frame along a length substantially perpendicular to a width of the frame; and a surface coupled to a terminal end of each of the pair of legs, the flat surface adapted to rest against the wearer's face.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

The system and post-operative care device as disclosed herein is further described in terms of exemplary embodiments. These exemplary embodiments are described in detail with reference to the drawings, which have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals represent similar structures throughout the several views of the drawings. The drawings that accompany the detailed description can be briefly described as follows:

FIG. 5 illustrates a perspective-exploded view of a post-operative care device for lifting an eyewear frame bridge away from a wearer's face, in accordance with some exemplary embodiments of the present invention.

FIG. 6 illustrates another perspective-exploded view of the post-operative care device depicted in FIG. 5.

FIG. 7 illustrates a perspective-exploded view of a post-operative care device for lifting an eyewear frame bridge away from a wearer's face, in accordance with some exemplary embodiments of the present invention.

FIG. 8 illustrates a cross-sectional view of the post-operative care device depicted in FIG. 7.

FIG. 9 illustrates a top view of the post-operative care device depicted in FIG. 7.

FIG. 10 illustrates another a cross-sectional view of the post-operative care device depicted in FIG. 7.

DETAILED DESCRIPTION OF THE INVENTION

Figure 1:
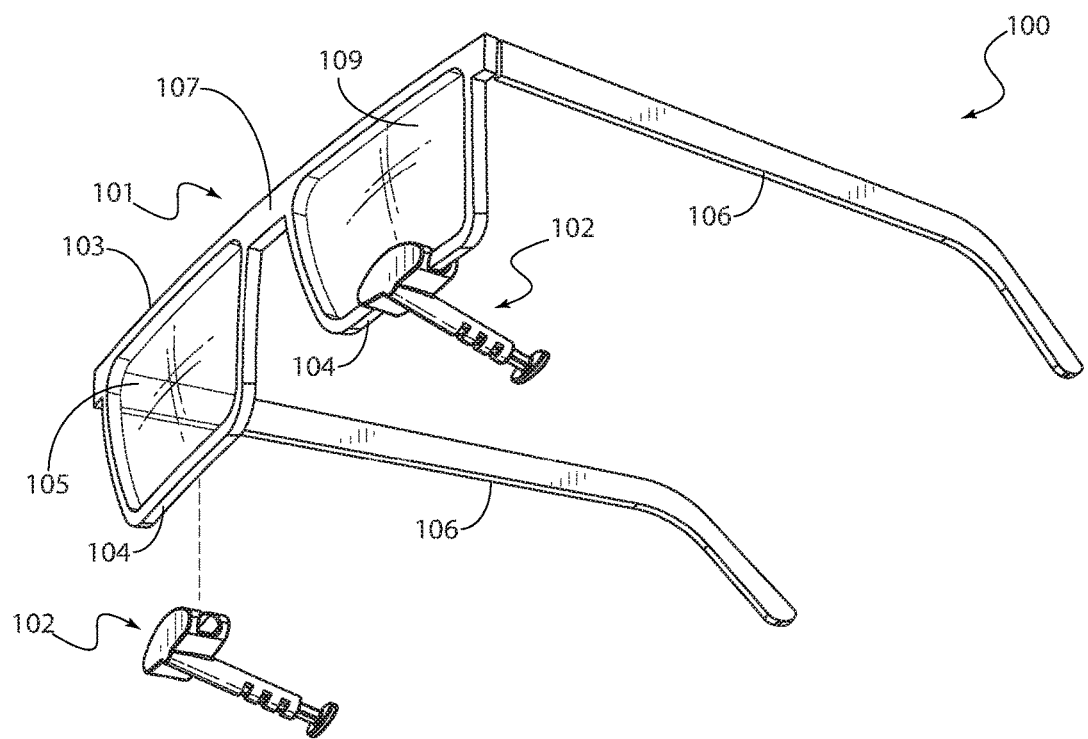
FIG. 1 illustrates a perspective view of a system for lifting an eyewear frame bridge away from a wearer's face, in accordance with some exemplary embodiments of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

Figure 2:
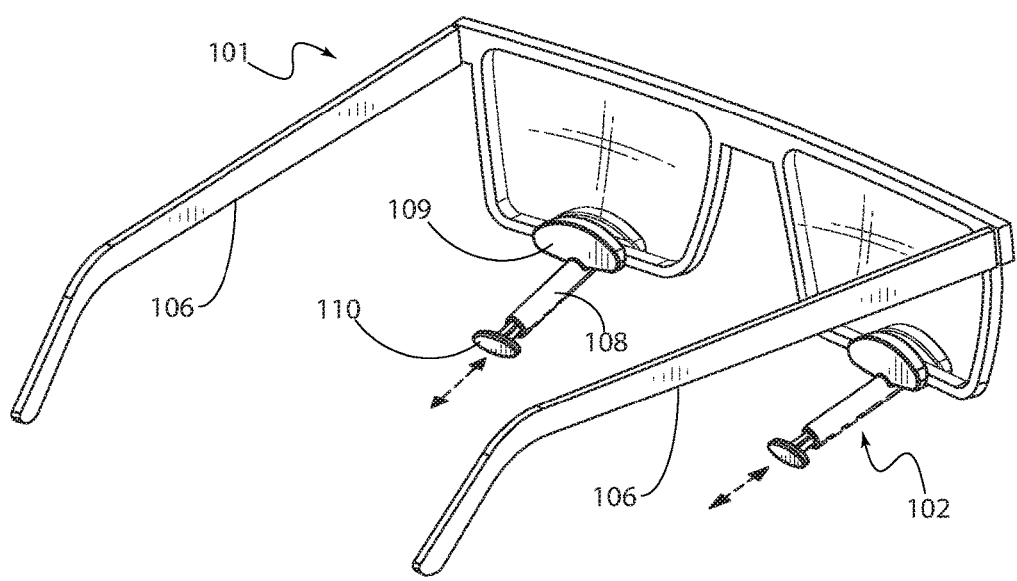
FIG. 2 illustrates another perspective view of the system for lifting an eyewear frame bridge in accordance with the exemplary embodiment of FIG. 1.
Figure 3:
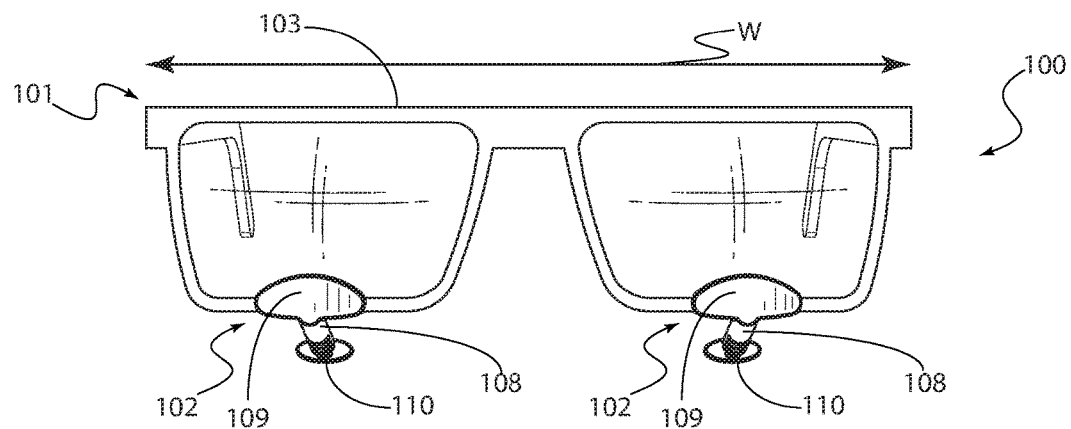
FIG. 3 illustrates a front view of the system for lifting an eyewear frame bridge in accordance with the exemplary embodiment of FIG. 1.
Figure 4:
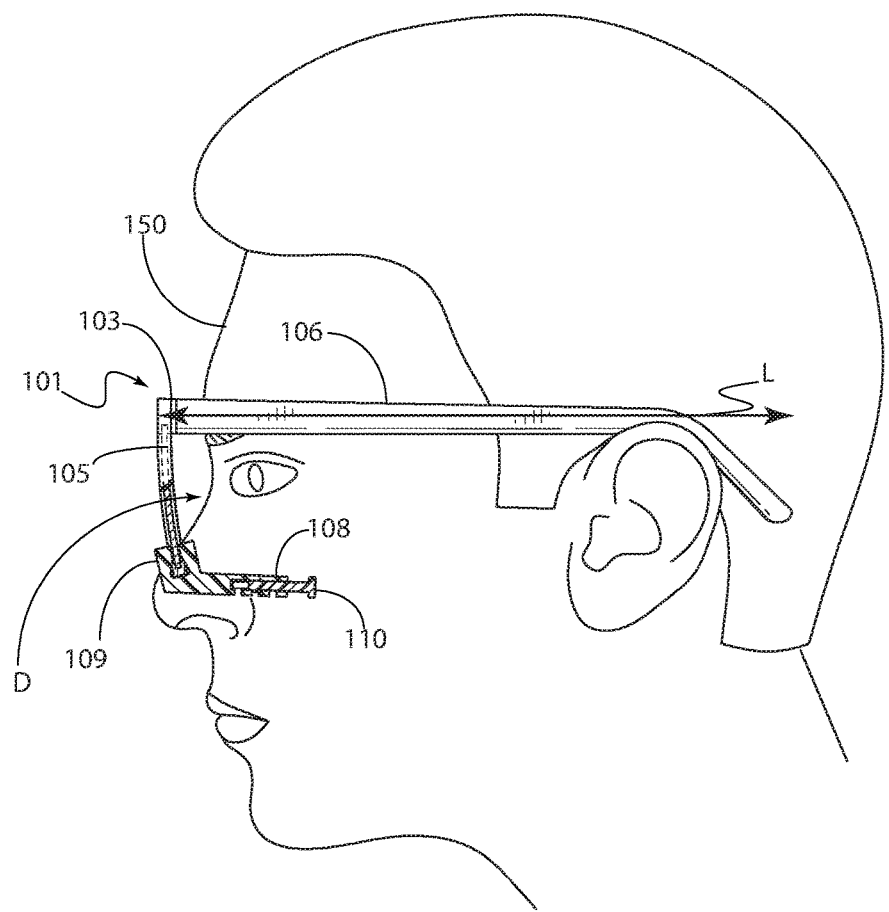
FIG. 4 illustrates a side and partial cross-sectional view of the system for lifting an eyewear frame bridge in accordance with the exemplary embodiment of FIG. 1.

Turning now to the first set of figures, FIG. 1 illustrates a perspective view of a system for lifting an eyewear frame bridge away from a wearer's face, in accordance with some exemplary embodiments of the present invention; FIG. 2 illustrates another perspective view of the system depicted in FIG. 1; FIG. 3 illustrates a front view thereof; and FIG. 4 illustrates a side and partial cross-sectional view thereof.

In these views, system 100 is shown comprising a pair of spectacles, also referred to as eyeglasses or eyewear 101, to which a pair of post-operative care devices 102 are removably coupled to facilitate lifting or removing at least a portion of the eyewear 101 away from a wearer's face so that, for example, a nose of the wearer may properly heal after undergoing treatment such as a surgery. Eyewear 101 may typically include a frame 103, a pair of rims 104 that secure lenses 105 therein, a pair of temples 106 hingely coupled to the frame 103, and a bridge 107 connecting each of the pair of rims 104.

As mentioned above and shown in FIG. 1, system 100 may include at least one and preferably although not necessarily a pair of post-operative care devices 102. In exemplary embodiments, a post-operative care device 102 may include a leg 108 coupled to a bottom portion of one of the pair of rims 104 of the frame 103, wherein the leg extends towards a posterior of the frame 103 along a length L (see also FIG. 4) substantially perpendicular to a width W of the frame 103 (see also FIG. 3) and substantially parallel to the pair of temples 106 hingely coupled to the frame 103; substantially parallel meaning running along in the general direction but not necessarily be parallel with. In exemplary embodiments, at least one post-operative care device 102 includes a coupler or clasp 109 configured to receive the bottom portion of one of the pair of rims 104 of the frame 103, so that the at least one post-operative care device 102 may be removably coupled to the frame 103. As will be disclosed with reference to another figure below, in some exemplary embodiments, post-operative care device may be integral with and form a part of a frame of a specialized eyewear that incorporates the post-operative care component.

As illustrated with some detail in FIG. 2, in some exemplary embodiments each leg 108 of each post-operative care device 102 may be extendable and thus adjustable to fit a wide variety of wearers. As may be appreciated from this view, when coupled to eyewear 101, each of the post-operative devices 102 fits snuggly at a bottom portion of rims 104 and extend towards a posterior end of frame 103 so that legs 108 of devices 102 extend substantially parallel to temples 106 and substantially perpendicular to a width across the front end of frame 103 of eyewear 101.

Turning now specifically to FIG. 3, a front view of system 100 shows how in some exemplary embodiments, clasp 109 may comprise a generally flat anterior end configured to snuggly receive a bottom portion of a rim 104 of frame 103 of eyewear 101. From this view (as well as the view of FIG. 2), it may also be appreciated that in some exemplary embodiments, legs 108 may include a flat support or flat surface 110 adapted to rest against the wearer's face.

Turning now specifically to FIG. 4, a side and partial cross-sectional view of system 100 is illustrated in accordance with the exemplary embodiments just disclosed. From this view, it may further be appreciated how post-operative care device 102 snuggly hugs or couples to the bottom portion of rim 104 of frame 103 of eyewear 101. Moreover, leg 108 is exemplarily shown as comprising an extendable leg, which as will be explained further with reference to other figures, may be configured to telescope outwards so that the extendable leg is adjustable at various lengths.

As can be seen from this figure, frame 103 of eyewear 101 is lifted or pulled away from the face of the wearer 150 because the legs 8 of device 102 extend the distance between the frame 103 and wearer 150's face—and more specifically the distance between the bridge 107 and rims 104 of frame 103 to the nose of wearer 150. This distance D allows a nose that has undergone treatment such as surgery to be relieved from the potential pressure that may be caused by bridge 107 of frame 103 of eyewear 101.

Turning now to the next set of figures, FIG. 5 illustrates a perspective-exploded view of a post-operative care device for lifting an eyewear frame bridge away from a wearer's face, in accordance with some exemplary embodiments of the present invention; and FIG. 6 illustrates another perspective-exploded view of the post-operative care device depicted in FIG. 5.

More specially, these figures show an exemplary embodiment of post-operative care device 102 for lifting an eyewear frame bridge away from a wearer's face, comprising: a clasp 109 configured to register with eyewear 101, whereas mentioned above the eyewear 101 includes frame 103, a pair of rims 104 that secure lenses 105 therein, a pair of temples 106 hingely coupled to the frame 103, and a bridge 107 connecting the pair of rims 103, wherein the clasp 109 includes a base 111 with parallel walls 112 that form a channel 113 for receiving a bottom portion of one of the pair of rims 104 of the frame 103; and a leg 108 extending at an angle X from the base 111 of the clasp 109, the leg 108 including a terminal end 115 opposite the clasp 109 configured to rest against the wearer's face.

In some exemplary embodiments, the parallel walls 112 that form channel 113 include an interior surface that grasp against an exterior portion of the rim of eyewear. Although typically, and not necessarily, the interior surface of each of walls 112 may be flat, in some exemplary embodiments as discussed further below, the interior surface may be angled or tapered to facilitate registering with the eyewear frame and providing a more snuggly fit.

In some exemplary embodiments, the terminal end 115 opposite the clasp 109 comprises a flat surface 116 perpendicular to the leg 108. Flat surface 116 may be padded or may include a soft material that may be different or the same as a material of post-operative device 102. Regardless of construction, flat surface 116 is adapted to rest against the wearer's face, for example, and without limiting the scope of the present invention, as shown in FIG. 4.

In some exemplary embodiments, as shown in FIG. 5 and FIG. 6, leg 108 is an extendable leg comprising a telescoping component having a receiving member 117 and an extending member 118 slidably housed inside the receiving member 117. In exemplary embodiments, the telescoping leg may provide a means for selectively adjusting the leg at a particular predetermined length. For example, and without limiting the scope of the present invention, leg 108 may comprise receiving member 117, which includes a plurality of openings 119. Moreover, extending member 118 may complimentarily include a surface 120 with one or more protrusions such as protrusion or stop 121 that registers with the plurality of openings 119 of receiving member 117, wherein the plurality of openings 119 and stop 121 are configured to lock the extending member 118 of the telescoping leg 108 at a plurality of predetermined lengths dictated by each of the plurality of openings 118. To slidably receive extending member 118, receiving member 117 typically employs a tubular housing with a cavity adapted to the receive the same, for example, and without limiting the scope of the present invention, a tubular cavity 122 that runs a length of leg 108 approximately up to or near to base 111.

From these views, as well as other views in other figures discussed in more detail below, it may be appreciated that a leg of a device in accordance with the present invention such as leg 108 may extend from base 111 at an angle rather than straight out a posterior wall 113. Since leg 108 may be angled from base 111, accordingly, tubular cavity 122 may be typically angled in relation to base 111 as well. Such embodiments allow for a better fit and enable proper support between the frames of the eyewear and the portion of the wearer's face that contacts the post-operative care device 102.

Turning next to the following set of figures, a similar exemplary embodiment is shown with reference to FIG. 7-FIG. 10. More specifically, FIG. 7 illustrates a perspective-exploded view of a post-operative care device for lifting an eyewear frame bridge away from a wearer's face, in accordance with some exemplary embodiments of the present invention; FIG. 8 illustrates a cross-sectional view of the post-operative care device depicted in FIG. 7; FIG. 9 illustrates a top view of the post-operative care device depicted in FIG. 7; and FIG. 10 illustrates another a cross-sectional view of the post-operative care device depicted in FIG. 7. The exemplary embodiment shown in these figures is very similar to the embodiment previously disclosed above, albeit having several additional structures that structurally reinforce the post-operative device.

Accordingly, in such exemplary embodiment, post-operative care device 200 for lifting an eyewear frame bridge away from a wearer's face, may comprise: a clasp 201 configured to register with eyewear 101, the eyewear 101 including a frame 103, a pair of rims 104 that secure lenses 105 therein, a pair of temples 106 hingely coupled to the frame 103, and a bridge 106 connecting the pair of rims 104, wherein the clasp 201 includes a base 202 having parallel walls 203 that form a channel 204 for receiving a bottom portion of one of the pair of rims of the frame 103; and a leg 205 extending at an angle from the base 202 of the clasp 201, the leg 205 including a terminal end 206 opposite the clasp 201 adapted or configured to rest against the wearer's face.

As with the embodiment shown with reference to previous figures, leg 205 is an extendable leg comprising a telescoping component having a receiving member 207 and an extending member 208 that is slidably housed inside the receiving member 207. To provide adjustability, receiving member 207 may include a plurality of openings 209 and extending member 208 may complimentarily include a surface with one or more protrusions such as protrusion or stop 210 that registers with the plurality of openings 209 of receiving member 207, wherein the plurality of openings 209 and stop 210 are configured to lock the extending member 208 of the telescoping leg 205 at a plurality of predetermined lengths dictated by each of the plurality of openings 209. In exemplary embodiments, a tubular cavity 211 runs along a portion of a length of leg 205 approximately up to or near to base 202. Extending member 207 is slidably received within tubular cavity 211 of receiving member 207.

Extending from each side of leg 205, and more specifically receiving member 207, planar walls 212 expand laterally and angled away from walls 203 of base 202 of clasp 201. Similarly, a single support wall 213 situated along a length and top surface of receiving member 207 of leg 205, may provide additional structural support to post-operative care device 200. In some exemplary embodiments, wall 213 is situated perpendicular to planar walls 212, which expand away from and also run along the length of receiving member 207 of leg 205.

Turning specifically to FIG. 8, a cross-sectional view along line A-A depicts tubular cavity 211 running along a portion of a length of leg 205 approximately up to or near to base 202, and further depicts channel 204 formed by parallel walls 203 of clasp 201.

From this view, it may be appreciated that the channel 204 of clasp 201 comprises a tapered cross-section, whereby the bottom portion of channel 204 is wider and formed by angled wall portions 214 at a bottom region of each of parallel walls 213. In such exemplary embodiments, the interior surfaces of each of walls 213 may be angled so as to grasp against an exterior portion of the rim of eyewear. Although typically, and not necessarily, the interior surface of each of walls 213 may be flat, the interior surface may be angled or tapered as shown to facilitate registering with the eyewear frame and providing a more snuggly fit.

From this view, it may be better appreciated how the tubular cavity 211 running along a portion of a length of leg 205 includes the plurality of openings 209 so that a surface 215 of the extending member 208 may register therein in order to selectively lock and thus adjust a length of leg 205 by securing extending member 208 at a plurality of lengths.

Turning specifically to FIG. 9, a top view of device 201 shows that channel 204 may further include flared openings 216 at either end of channel 204, which may be formed by flared terminal ends on either wall 203 extending from base 202 that forms clasp 201 of post-operative care device 200.

Turning now specifically to FIG. 10, a cross-sectional view taken along line B-B depicts how the angled nature of leg 205 means that a height H is formed between base 202 to a surface when base 202 is situated parallel to said surface. Also, from this view support wall 213 situated along a length and top surface of receiving member 206 of leg 205 is seen perpendicular to a posterior wall 203 and perpendicular to one of the planar walls 212, which expands away from and also run along the length of receiving member 206 of leg 205. Note that in each of FIG. 9 and FIG. 10, the extending member 208 of leg 205 is not shown.

Figure 11:
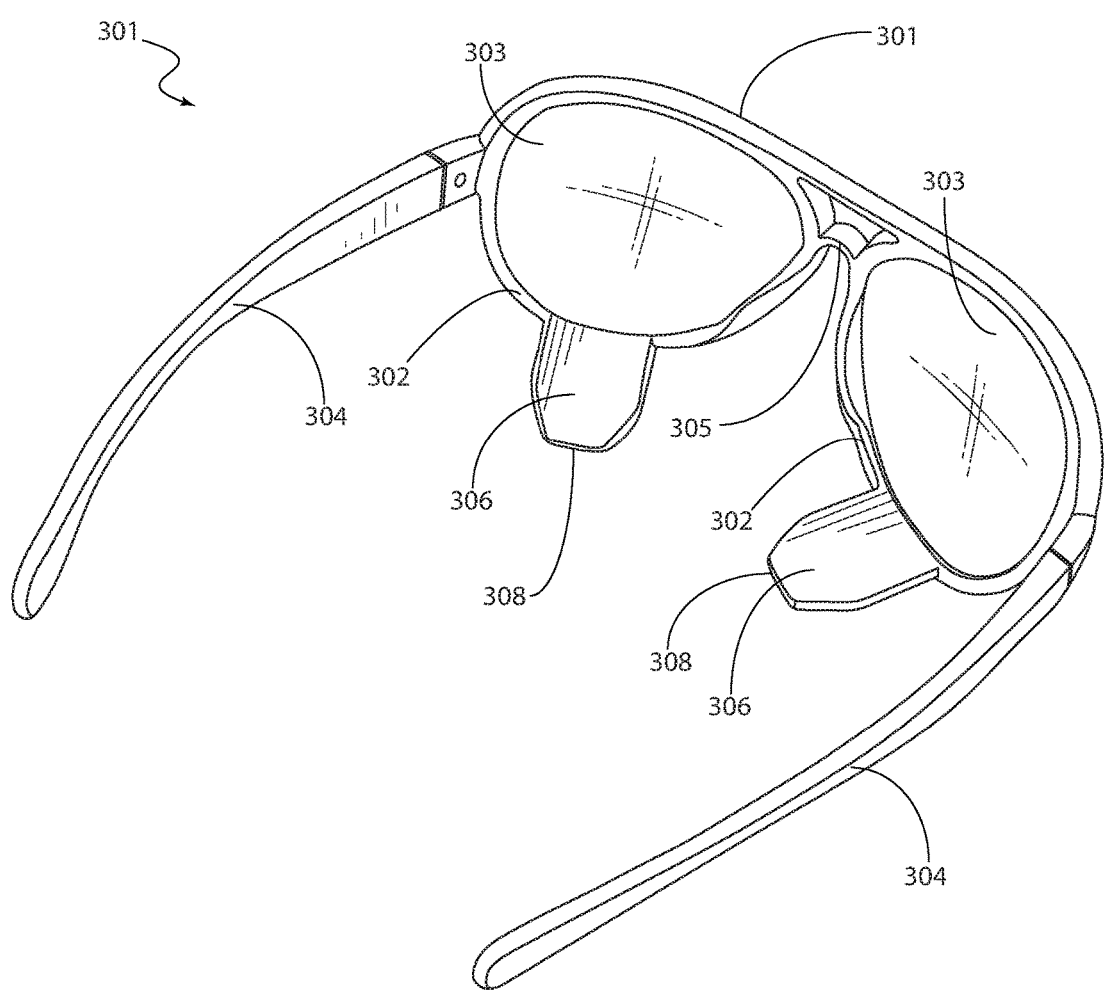
FIG. 11 illustrates a perspective view of a system for lifting an eyewear frame bridge away from a wearer's face, in accordance with some exemplary embodiments of the present invention.
Figure 12:
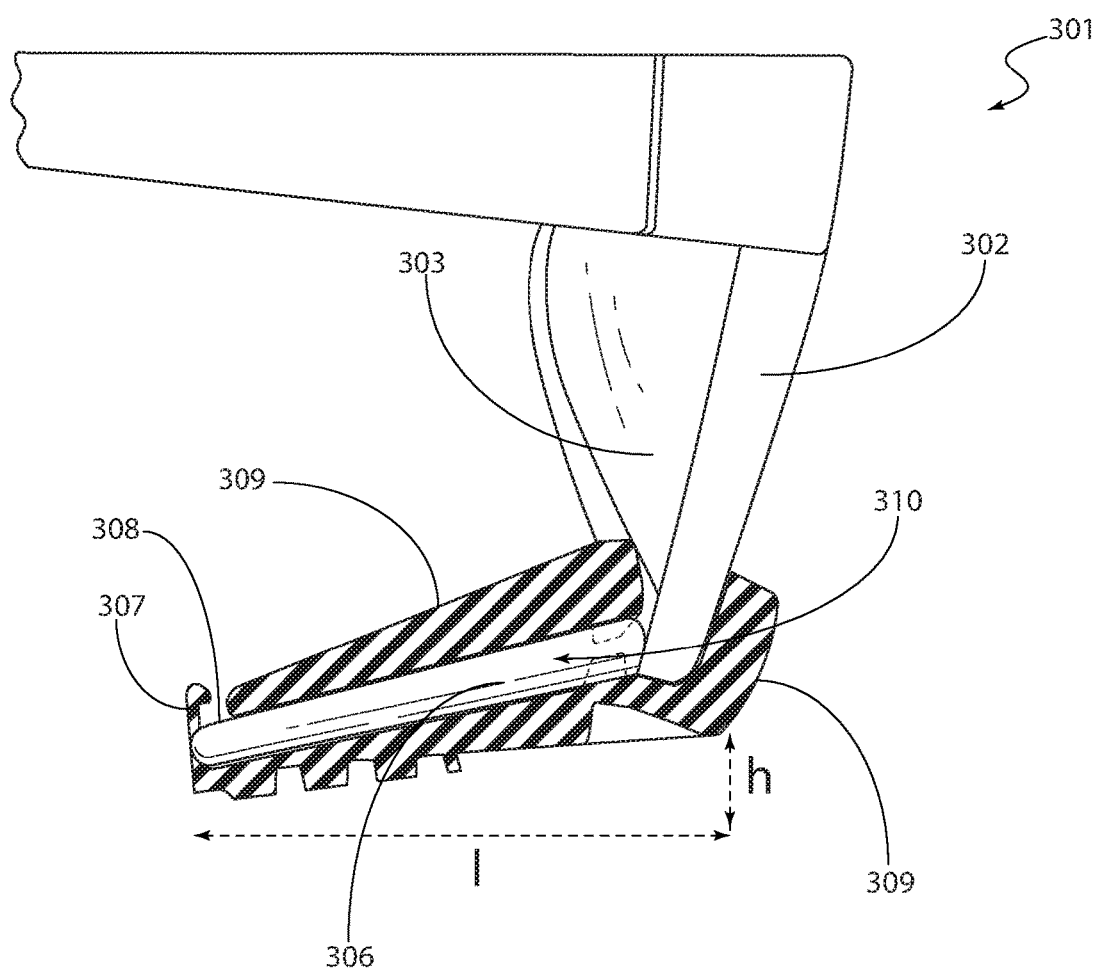
FIG. 12 illustrates a side and partial cross-sectional view of the system depicted in FIG. 11.

Turning now to the final set of figures, FIG. 11 illustrates a perspective view of a system for lifting an eyewear frame bridge away from a wearer's face, in accordance with another exemplary embodiment of the present invention in which the post-operative care device is integral with the eyewear. FIG. 12 illustrates a side and partial cross-sectional view of the system depicted in FIG. 11. More specifically, FIG. 11 depicts post-operative care device 300, which in accordance with some exemplary embodiments of the present invention may include: a frame 301 with a pair of rims 302 that secure lenses 303 therein; a pair of temples 304 hingely coupled to the frame 301; a bridge 305 connecting each of the pair of rims 302; a pair of legs 306 extending from a bottom portion of each of the pair of rims 302 of the frame 301, wherein the pair of legs 306 each extend at an angle towards a posterior of the frame 301 along a length substantially perpendicular to a width of the frame and substantially parallel to a length of the temples 306; and a flat surface 307 coupled to a terminal end 308 of each of the pair of legs 306, the flat surface 307 adapted to rest against the wearer's face.

In some exemplary embodiments, post-operative care device 300 may further include a pair of covers 309 (which include the flat surface 307) coupled to each of the pair of legs 306 for providing a cushioning support to the wearer, each of the pair of removable covers 309 including a channel 310 adapted to receive a portion of one of the pair of legs 306. In some exemplary embodiments, cover 309 is removable while in some exemplary embodiments, cover 309 is permanently affixed as a cushioning layer over the legs 306 that are integral with the eyewear frame 301.

As may be appreciated by a person of ordinary skill in the art, a post-operative care device in accordance with the present invention may be constructed of a wide range of materials. For example, and without limiting the scope of the present invention, in some exemplary embodiments, a post-operative care device comprises rubber. In some exemplary embodiments, a post-operative care device comprises medical grade liquid silicone rubber. In some exemplary embodiments, for example as in the last set of figures, the eyewear frame may be constructed of a harder plastic while cover may include a softer rubber material.

A system and apparatus for lifting an eyewear frame bridge including an automated self-loading cargo carrier for automobiles has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A post-operative care device for lifting an eyewear frame bridge away from a wearer's face, comprising:
   a clasp configured to register with eyewear, the eyewear including a frame, a pair of rims that secure lenses therein, a pair of temples hingely coupled to the frame, and a bridge connecting the pair of rims; and
   a telescoping leg extending from the base of the clasp, the telescoping leg including:
      a tubular housing with a plurality of openings along a length of the tubular housing; and
      an extending member slidably housed inside the tubular housing including a terminal end opposite the clasp configured to rest against the wearer's face, wherein a surface of the extending member includes at least one stop that registers with each of the plurality of openings along the length of the tubular housing to lock the extending member of the telescoping leg at a plurality of lengths.

2. The post-operative care device of claim 1, wherein the terminal end opposite the clasp comprises a flat surface perpendicular to the extending member.

3. The post-operative care device of claim 1, wherein the clasp includes a base with parallel walls that form a channel for receiving the bottom portion of one of the pair of rims of the frame.

4. The post-operative care device of claim 1, wherein the telescoping leg is positioned at an angle from the base of the clasp.

5. The post-operative care device of claim 1, wherein the plurality of openings along the length of the tubular housing run along a bottom portion of the tubular housing.

6. The post-operative care device of claim 1, wherein the channel of the clasp comprises a tapered cross-section.

7. The post-operative care device of claim 1, wherein the channel includes a bottom section that is wider than a top section of the channel.

8. The post-operative care device of claim 1, wherein the clasp includes a flat anterior end.

9. The post-operative care device of claim 1, wherein the surface of the extending member includes a plurality of stops, each configured to register with each of the plurality of openings along the length of the tubular housing to lock the extending member of the telescoping leg at a plurality of lengths.

10. A system for lifting an eyewear frame bridge away from a wearer's face, comprising:
  eyewear, including a frame with a pair of rims that secure lenses therein, a pair of temples hingely coupled to the frame, and a bridge connecting each of the pair of rims; and
  at least one post-operative care device including a telescoping leg coupled to a bottom portion of one of the pair of rims of the frame, the telescoping leg including:
    a tubular housing with a plurality of openings along a length of the tubular housing; and
    an extending member slidably housed inside the tubular housing including a terminal end opposite the clasp configured to rest against the wearer's face, wherein a surface of the extending member includes at least one stop that registers with each of the plurality of openings along the length of the tubular housing to lock the extending member of the telescoping leg at a plurality of lengths.

11. The system of claim 10, wherein the at least one post-operative care device includes a clasp configured to receive the bottom portion of one of the pair of rims of the frame, so that the at least one post-operative care device is removably coupled to the frame.

12. The system of claim 11, wherein the clasp comprises a base, the base having parallel walls that form a channel for receiving the bottom portion of one of the pair of rims of the frame.

13. The system of claim 12, wherein the telescoping leg of the at least one post-operative care device extends at an angle away from a bottom portion of the clasp.

14. The system of claim 13, wherein the plurality of openings along the length of the tubular housing run along a bottom portion of the tubular housing.

15. The system of claim 14, wherein the channel of the clasp comprises a tapered cross-section.

16. The system of claim 14, wherein the channel includes a bottom section that is wider than a top section of the channel.

17. The system of claim 14, wherein the clasp includes a flat anterior end.

18. The system of claim 14, wherein the surface of the extending member includes a plurality of stops, each configured to register with each of the plurality of openings along the length of the tubular housing to lock the extending member of the telescoping leg at a plurality of lengths.

* * * * *